(12) United States Patent
Johnson

(10) Patent No.: US 10,380,113 B2
(45) Date of Patent: *Aug. 13, 2019

(54) INFORMATION ARCHIVAL AND RETRIEVAL SYSTEM FOR INTERNETWORKED COMPUTERS

(71) Applicant: Rodney D. Johnson, Needham, MA (US)

(72) Inventor: Rodney D. Johnson, Needham, MA (US)

( * ) Notice: Subject to any disclaimer, the term of this patent is extended or adjusted under 35 U.S.C. 154(b) by 1103 days.

This patent is subject to a terminal disclaimer.

(21) Appl. No.: 14/519,110

(22) Filed: Oct. 20, 2014

(65) Prior Publication Data

US 2015/0039595 A1    Feb. 5, 2015

Related U.S. Application Data

(63) Continuation of application No. 12/873,289, filed on Aug. 31, 2010, now Pat. No. 8,868,435, which is a continuation of application No. 09/909,502, filed on Jul. 19, 2001, now Pat. No. 7,792,682.

(60) Provisional application No. 60/219,515, filed on Jul. 20, 2000.

(51) Int. Cl.

| | |
|---|---|
| *G06Q 10/10* | (2012.01) |
| *G06Q 10/06* | (2012.01) |
| *G06Q 30/06* | (2012.01) |
| *G06F 16/2455* | (2019.01) |
| *G06F 16/25* | (2019.01) |
| *G06F 16/248* | (2019.01) |
| *G06F 16/951* | (2019.01) |
| *G06F 16/22* | (2019.01) |

(52) U.S. Cl.
CPC ...... *G06F 16/2455* (2019.01); *G06F 16/2228* (2019.01); *G06F 16/248* (2019.01); *G06F 16/25* (2019.01); *G06F 16/951* (2019.01); *G06Q 10/10* (2013.01)

(58) Field of Classification Search
CPC ........... G06F 17/30864; G06F 16/2455; G06F 16/25; G06F 16/248; G06F 16/951; G06F 16/2228; G06Q 10/10
USPC ................................................ 705/1.1–912
See application file for complete search history.

(56) References Cited

U.S. PATENT DOCUMENTS

| | | | | |
|---|---|---|---|---|
| 5,991,773 A | * | 11/1999 | Tagawa | G06F 17/30873 |
| 6,282,548 B1 | * | 8/2001 | Burner | G06F 17/3089 |
| 6,654,813 B1 | * | 11/2003 | Black | G06F 17/30873 |
| | | | | 707/E17.111 |
| 6,735,585 B1 | * | 5/2004 | Black | G06F 17/30864 |

* cited by examiner

*Primary Examiner* — Jonathan P Ouellette
(74) *Attorney, Agent, or Firm* — The Johnson IP Law Firm; Rodney D. Johnson

(57) ABSTRACT

A computing system can archive information from internetworked computers, such as Internet content, for later retrieval. A server system processes content providers, such as DNS registries and web sites, to extract and store content, including text, image, audio, and video content. For web sites, HTML source code is stored along with a browser-rendered display file. The content is perpetually archived to create a historical record of information for each content provider. An interface is used to retrieve the archived content in response to queries.

42 Claims, 18 Drawing Sheets

FIG. 3

```
[whois.crsnic.net]Whois Server Version 1.3Domain names in the .com, .net, and .org domains can now be registered
with many different competing registrars. Go to http://www.internic.net
for detailed information.    Domain Name: TRIEVE.COM
    Registrar: THE NAME IT CORPORATION DBA AITDOMAINS.COM
    Whois Server: whois.aitdomains.com
    Referral URL: http://www.aitdomains.com
    Name Server: NS0.NAMEIT.NET
    Name Server: NS1.NAMEIT.NET
    Updated Date: 05-aug-2000
The Registry database contains ONLY .COM, .NET, .ORG, .EDU domains and
Registrars.

[whois.aitdomains.com]

The Data in THE AIT DOMAINS CORPORATION ' WHOIS database is provided
by THE AIT DOMAINS  CORPORATION for information purposes, and to assist
persons in obtaining information about or related
to a domain name registration record.
THE AIT DOMAINS CORPORATION  does not guarantee its accuracy. By submitting a
WHOIS query, you agree that you will use this Data only for lawful
purposes and that, under no circumstances will you use this Data to:
(1) allow, enable, or otherwise support the transmission of mass
unsolicited, commercial advertising or solicitations via e-mail
(spam); or  (2) enable high volume, automated, electronic processes
that apply to THE AIT DOMAINS CORPORATION  (or its systems).

THE AIT DOMAINS CORPORATION reserves the right to modify these terms at any time.
By submitting this query, you agree to abide by this policy.

Registrant:

Rodney  Johnson
57 Pine Street

Needham
MA  US  02492
rdj.home@bigfoot.com

Phone: 781-449-9479
Fax: 781-444-3418

Domain Name: trieve.com

Administrative Contact:
 Rodney  Johnson
 57 Pine Street

Needham
 MA  US
 02492
 rdj.home@bigfoot.com

Phone: 781-449-9479
Fax: 781-444-3418

Technical Contact:
 Rodney  Johnson
 57 Pine Street

Needham
 MA  US
 02492
 home@dowjo.com

Phone: 781-696-3516
Fax: 781-444-3418

Billing Contact:
 Rodney  Johnson
 57 Pine Street

Needham
 MA  US
 02492
 home@dowjo.com

Phone: 781-696-3516
Fax: 781-444-3418

Record Created on........ 2000-02-05 12:53:46.000
Record last updated on... 2000-08-05 00:13:25.000
Expire on................ 2002-02-05 12:54:10.000

Domain servers in listed order:

ns0.nameit.net 208.234.1.116
  ns1.nameit.net

Register Your Domain at www.aitdomains.com
```

39

*trieve*™

Trieve Solutions designs and develops CYBER*trieve*™ technology for archiving and retrieving Internet content. Our AUTO*trieve*™ servers process web sites on a continual basis to extract and store content, including text, image, sound, and video content. Our mission is to archive public Internet content for later retrieval to support the legal and business communities, as well as for use by individual clients.

We perpetually archive content to create a historical record of web site evolution. To that end, our SITE*trieve*™ robots maintain a list of existing domain names: growing with the expansion of the Internet. In addition, our WHO*trieve*™ robots maintain historical Whois information for each domain name. Every public file for every domain name is then indexed and archived by our PAGE*trieve*™ robots. Domain name content is augmented by FIND*trieve*™ robots, which crawl through the Internet, accessing addition web pages.

Retrieval of the data is through our ARC*trieve*™ interface. Various report formats are available to suit our clients' needs. Tired of stale search results from other search engines? Our additional LINK*trieve*™ module can interface with any affiliated search engine to provide historical content for those stale links, or any other hit.

For more information, please contact us.

Please also read our legal notice.

© 2000 Trieve Solutions. All rights reserved.

FIG. 5

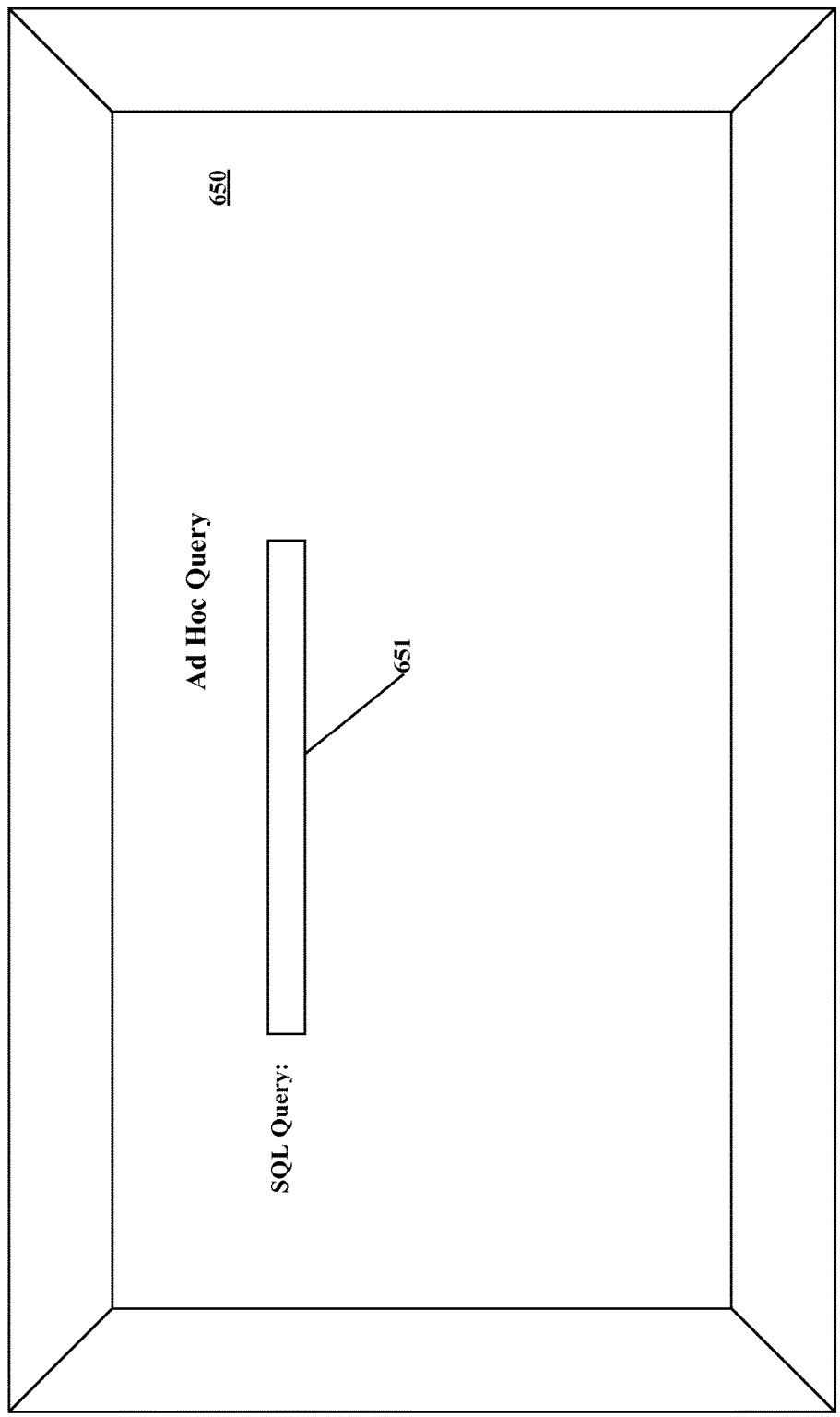

INFORMATION ARCHIVAL AND RETRIEVAL SYSTEM FOR INTERNETWORKED COMPUTERS

RELATED APPLICATIONS

This application is a continuation of U.S. application Ser. No. 12/873,289, filed on Aug. 31, 2010, which is a continuation of U.S. application Ser. No. 09/909,502, filed Jul. 19, 2001 (now U.S. Pat. No. 7,792,682), which claims the benefit of U.S. Provisional Application No. 60/219,515, filed Jul. 20, 2000. The entire teachings of the above applications are incorporated herein by reference.

BACKGROUND

The Internet is a vast internetwork of individual computers and computer networks used to share information. Every computer connected to the Internet has a unique Internet Protocol (IP) address. The IP addresses are used to route messages between computers across the Internet and through user networks. Using the IP addresses, any two computers can communicate with one another. In its most basic form, the Internet can be used as a peer-to-peer network. Such a paradigm can be exploited to exchange files between computers, such as File Transport Protocol (FTP) applications. A more common model is the client-server model where web servers store and transmit information, in the form of web pages, to clients upon request. Another application of client-server applications is a newsgroup, where clients can exchange information through a news server.

The Internet, in whatever form, is largely open and unmanaged. Anyone with a computer can connect to the Internet to gather or share information. In addition, any computer can be added to or removed from the Internet at will. Moreover, the information on any given computer can be changed at will. Consequently, the information available on the Internet is extremely fluid.

Because of the Internet's rapidly changing nature, searching for information is limited to viewing snapshots of the Internet. Although many search engines are available to search the Internet, they all suffer from a similar problem. Namely, information found and indexed by a search engine at a particular time may not exist at a later time—when it is needed. Thus, a search engine may report relevant search results but the underlying information may have since been removed from the Internet. A researcher using the search engine can be stymied by stale links to the now nonexistent information.

Eventually, the search engine may purge its database of the old and now nonexistent information. In other words, the search engine may no longer report that the information ever existed. Unless the information reappears, it can be lost forever.

SUMMARY

There are times when a researcher seeks historical records of information. Although news reporting services typically archive news articles, they only archive their own content and may restrict access to the archived data. Unlike professional news services, individual and corporate web sites and other Internet nodes do not publicly archive their content at all. Although a user may backup versions of its web site, the backup copies are controlled by the user and may not be available to others. Those content providers may account for the bulk of the information on the Internet.

The information sought by a searcher can depend on various factors. Typical information includes web site content. The information may also include metatags or internal source coding. The searcher may be an individual researcher looking for specific publications or a professional researcher looking for specific acts on the Internet.

Of particular interest are legal researchers defending intellectual property rights. For example, a trademark searcher might be interested in all uses of a particular mark, from its use on a web page or its existence in a web page's metatags. A copyright searcher might be interested in the existence of works on web pages. Similarly, a patent searcher might be interested in offers to sell products on web sites. A researcher may also want to trace the evolution of a known web site over time to, for example, measure damages caused by the site. The technology to do these searches, alone or in combination, is not currently available.

A suitable solution has not existed because, in part, of the quantity of data that must be stored. The storage requirements become unmanageable for real-time systems. As long as results do not need to be provided to a user in real time, most of the information can be stored offline.

In accordance with an aspect of the invention, a system for storing information for later retrieval can include a plurality of archived data files in storage, including a plurality of archived media files copied from a specific electronic address over time, where each archived media file having a version of authored content stored therein as collected from the specific electronic address at a specific time. The system can also include a searchable electronic index of the authored content stored within the archived media files, with the electronic index including references to the archived media files. A query engine can be in communication with the electronic index for retrieving an archived media file based on a query parameter and the electronic index.

Another embodiment of a system for storing information for later retrieval can include a plurality of archived data files in storage, including a plurality of archived rendered files associated with a specific electronic address over time, where each archived rendered file having a version of rendered content stored therein. Furthermore, the rendered content can include an image of a browser display responsive to operation of a respective source file as accessed from the specific electronic address at a specific time. The system can also include a searchable electronic index of the rendered content stored within the archived rendered files. A query engine can be in communication with the electronic index for retrieving an archived rendered files based on a query parameter and the electronic index.

Yet another embodiment of a system for storing information for later retrieval can include a plurality of archived data files in storage, including a plurality of archived original source files associated with a specific electronic address over time and a plurality of archived rendered files. Each archived original source file can have a version of authored content stored therein as collected from the specific electronic address at a specific time and each archived rendered file can have a version of rendered content stored therein, where the rendered content including an image of a browser display responsive to operation of a respective archived original source file. A database can associate the archived source files with the archived rendered files. The system can also include a searchable electronic index of the authored content stored within the archived original source files and the rendered content stored within the archived rendered files, where the electronic index including references to the archived original source files and the archived rendered files. A query engine can be in communication with the electronic index for retrieving the archived data files based on a query parameter and the electronic index.

In accordance with still another aspect of the invention, a system storing information for retrieval can include a database, processing modules, and a query engine.

The database stores data in an organized structure. The data can be associated with stored content from internetworked content providers. In particular, an archive can store the stored content in perpetuity. The database can include references to the stored content for retrieval from the archive.

The modules can be used to populate the database with data. The modules can, in turn, be in communication with the content providers, such as over a public access computer network like the Internet. The content providers can include content providers selected from domain name service registries and web servers.

The query engine can be responsible for retrieving the stored content based on a query parameter. The system can further include an indexer, the indexer creating a searchable index of the stored content. In particular, the index is a multimedia indexer. Using these tools, the stored content can be searched based on text, audio, video, or image content.

In accordance with another aspect, the invention can be embodied in a computerized system for the storage and retrieval of content from Internet content providers. The content can include registration content and page content.

The system can include a data warehouse structured to store content for later retrieval. The data warehouse can include a database structure for managing the stored content.

The system can also include a registration retrieval mechanism in communication with Internet registries for retrieving registration content for content providers. The retrieved content can then be stored in the data warehouse.

The system can include a page retrieval mechanism in communication with a content provider for retrieving page content from the content providers. The retrieved page content can then be stored in the data warehouse.

The system can include an indexer for indexing the stored content. A query engine can be coupled to the indexer for retrieving stored content. In particular, the indexer is a multimedia indexer. A user can thus find stored content based on text, audio, video, or image content. Furthermore, the query engine includes a program interface operable by a remote computer.

In accordance with another aspect, the invention can be embodied in a computerized system for archiving information from internetworked web content providers.

In this system, an identifier of a web content provider can be stored in a data warehouse. The identifier can be a unique address of the web content provider, such as a domain name or IP address. The domain name can be derived from a domain name registry. The data warehouse can include an offline storage medium.

For the web content provider, other information stored in the data warehouse can include a copy of registration data, a copy of source code for operating a web browser, and a copy of a browser-rendered display generated by the source code files. The stored information can include a copy of a multimedia file. To save storage space, the stored information can be compressed by a compression algorithm.

A database can then associate the web content provider with the stored information. An indexer can also be provided to operate on the stored information. In particular, the indexer can include a digital signature engine operating on multimedia files.

The system can also include a user interface for querying the data warehouse. The user interface can be operable by a remote computer, such as through includes a third-party search engine interface.

In particular, the system can include web robots to retrieve information from a remote content provider. The remote content provider can be a registry storing the registration data or the web content provider storing the source code. The web content provider and the registry can support a protocol to facilitate the archival of information.

The system can further include a processing module to monitor changes to source code at the web content provider, based on the stored source code. In particular, the data warehouse stores a prior version and a current version of a changed source code file.

The system can further include a processing module to monitor changes to registration data at a registration content provider based on the stored registration data. In particular, the data warehouse stores a prior version and a current version of changed registration data.

In accordance with yet another aspect, the invention can be embodied in a computerized system for archiving data from distinct content providers, each associated with at least one publicly accessible file representing content. The system can include an identification for each content provider of multiple content providers and a mechanism that stores, for each identified content provider, the content of at least one publicly accessible file in a data archive for later retrieval. The stored content can be maintained in perpetuity.

In particular, the content providers are registered in a shared registry system. In addition, the at least one publicly accessible file includes registration data associated with the registry. The content provider can be identified by a unique address, such as a domain name or IP address.

The mechanism can include a data compression algorithm to reduce the size of the at least one file before storing the content in the data archive.

A database structure can be employed to associate each content provider with its stored content. The database structure can, in particular, track changes to the stored content over time.

The system can further include an indexer for maintaining a searchable index of the stored content. In particular, the indexer supports multimedia content. A query engine can be coupled to the indexer for processing queries against the stored content. The query engine can include a program interface operable by a remote computer.

In accordance with another aspect, the invention can be embodied in a computerized system for retrieving information from internetworked content providers. The system can include a user interface and a query result.

The user interface can be in communication with a data warehouse having stored information. The data warehouse can be located remote from the user interface. The user interface can be used to solicit a query from a user. The query can solicit at least one of an Internet domain name, a Universal Resource Locator, a text string, or a multimedia target. The user interface can, in particular, be a third-party search engine result identifying a Universal Resource Locator, which is responsive to the solicitation for a query.

A query result can then be presented to the user in response to the query. The query result can include obsolete information associated with a content provider. The query result can include a history of the information. The history can include changes to the information over time. The changes can include changes to an Internet domain name registration or changes to information stored at a specified address. The query result need not be presented in real time, instead requiring delayed access to offline storage.

The system can be particular useful for identifying users of intellectual property. In this regard, the query results are responsive to a query specifying a trademark (or service mark) or to a query specifying a work of authorship.

A more particular aspect of the invention can be embodied in a user interface for monitoring intellectual property rights across internetworked content providers. The user interface can include a query interface to solicit information related to an intellectual property right and a report responsive to the query information, the report including archived information associated at least one content provider.

The solicited information can be at least one of a trademark (or service mark), a work of authorship, or an invention. The solicited information can be entered as a file location. The file can be at least one of a text file, an audio file, an image file, or a video file.

The report can include archived information associated with multiple network registrars. Likewise, the report can include archived information from multiple web content providers. The archived information can, in particular, include obsolete information.

BRIEF DESCRIPTION OF THE DRAWINGS

The foregoing and other objects, features and advantages of the invention will be apparent from the following more particular description of particular embodiments of the invention, as illustrated in the accompanying drawings in which like reference characters refer to the same parts throughout the different views. The drawings are not necessarily to scale, emphasis instead being placed upon illustrating the principles of the invention.

FIG. 3 illustrates an exemplary Whois file of FIG. 2.

FIG. 5 illustrates an exemplary browser-rendered file of FIG. 2.

FIG. 16 illustrates an exemplary user interface for the ad hoc query method of FIG. 9.

DETAILED DESCRIPTION

Figure 1:
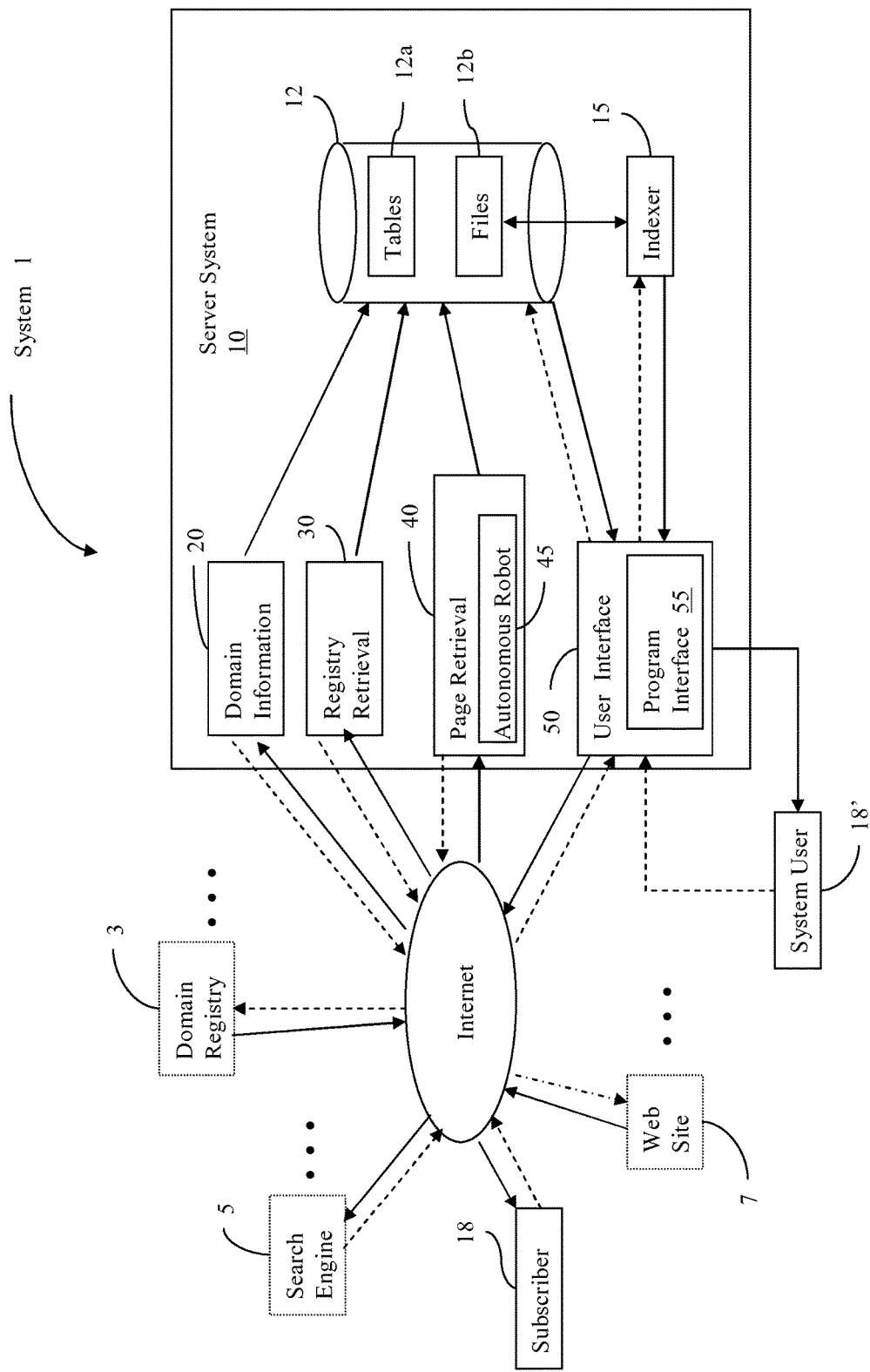
FIG. 1 is a schematic block diagram of a data archival and retrieval system for internetworked computers.

FIG. 1 is a schematic block diagram of a data archival and retrieval system for internetworked computers. The archival and retrieval system 1 includes a server system 10 in communication with a publicly accessible communication system, such as the Internet 2. The Internet interconnects a plurality of computers and computer networks. Those computers include, but are not limited to, Domain Name Service (DNS) Registries 3, Internet (third-party) search engines 5, and World Wide Web (WWW) servers 7. Also shown is a subscriber 18, who is authorized to use the services of the server system 10.

The server system 10 can be a clustered network of computers. The server system 10 stores information content from the Internet, such as web site data, for later retrieval. The data is stored in control database tables 12a and in files 12b of a data warehouse 12 accessible by a plurality of storage and retrieval modules. The data warehouse can be particularly suited to store multimedia data, such as Oracle interMedia for Oracle 8i, commercially available from Oracle Corporation of Redwood Shores, Calif. In a particular embodiment of the warehouse 12, the tables 12a are stored in a medium directly coupled to the server 10, such as a disk drive. In another embodiment, the files 12b are not directly coupled to the server 10, relying on delayed retrieval and access, such as through a manual or automated mechanical system. The length of time needed to retrieve information, however, does not limit the usefulness of the system.

A domain information module 20 is responsible for identifying web sites for archiving. A registry retrieval module 30 is responsible for obtaining domain name registry WHOIS information on domain names. The resulting content from various DNS registries is stored in the warehouse 12

A page retrieval module 40 is responsible for accessing individual web site pages and archiving the available information content in the warehouse 12. In general, the page retrieval module 40 is driven by domain name information provided by the domain information module 20. The page retrieval module 40 can also include a spider or an autonomous crawler robot 45 for independently identifying Internet resources, such as web pages, to archive. Because there are currently many Internet search engines in use that also identify web pages, the search engines can feed that data to the system. An indexer 15 creates and maintains a full-text, searchable index of the archived information.

User access to the archived information in the warehouse 12 (tables 12a and files 12b) is managed by a user interface module 50. User access can be provided online to the subscriber 18 or offline via a system user 18' to produce query reports. Both the subscriber 18 and system user 18' can perform queries of the data warehouse 12.

A program interface sub-module 55 of the user interface module 50 provides access to archived information associated with a given Universal Resource Locator (URL) page. The program interface sub-module 55 can also be accessed by the subscriber 18 and the system user 18'. In addition, Internet search engines 5 can subscribe to provide access to the URL-based program interface sub-module 55 to provide their users with the benefits of the archived information.

Figure 2:
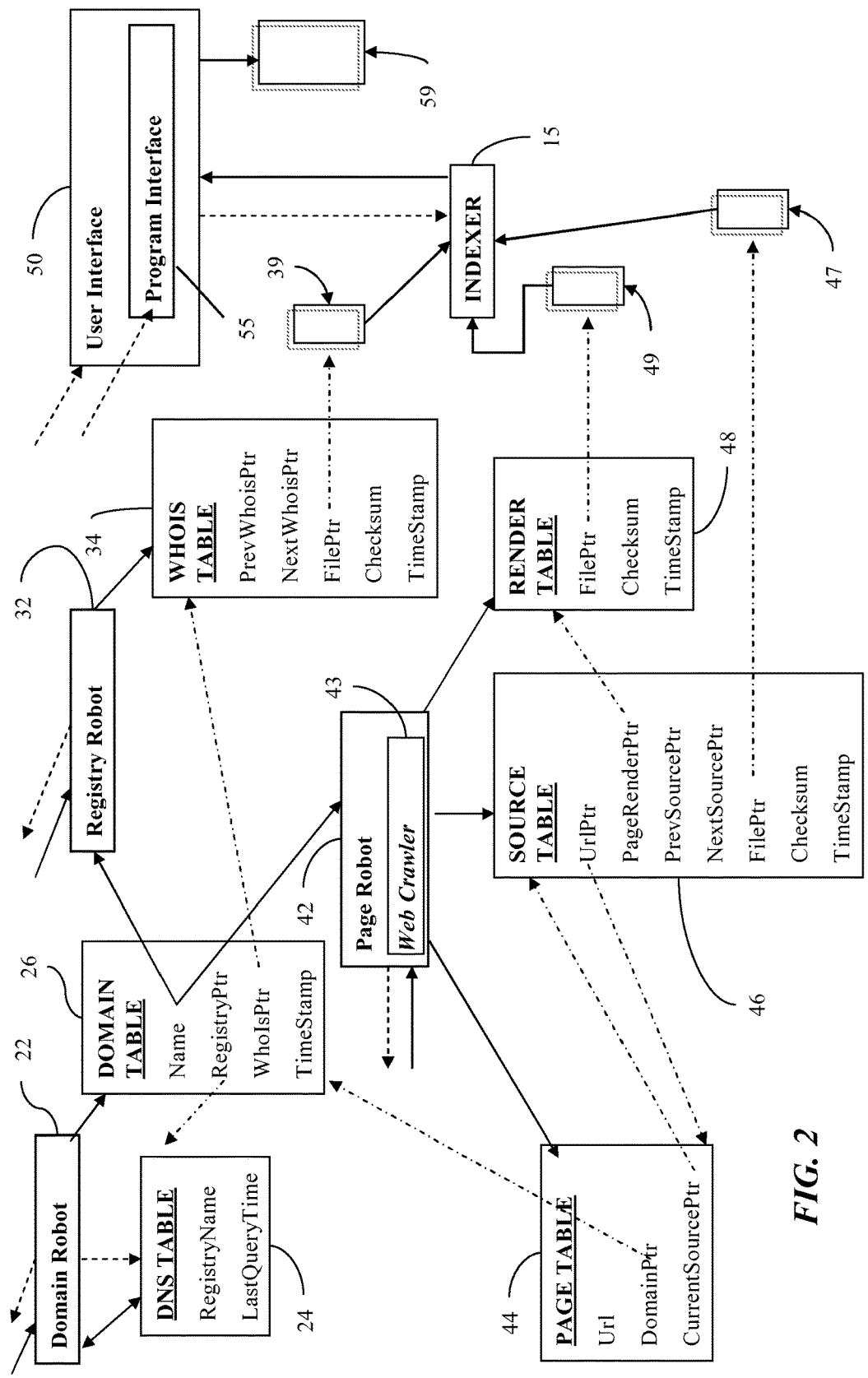
FIG. 2 is a detailed block diagram of portions of the server system of FIG. 1.

FIG. 2 is a detailed block diagram of the server system of FIG. 1. As shown, the server system automatically archives web pages and other Internet resources using software robots. In a basic embodiment, the archive is driven by DNS registry data.

The domain information module 20 includes a domain information robot 22, a Registry Table 24, and a Domain Table 26. The registry retrieval module 30 includes a registry retrieval robot 32, a Whois Table 34, and a plurality of Whois files 39. The page retrieval module 40 includes a page retrieval robot 42, an optional autonomous page retrieval robot 43, a Page Table 44, a Source Table 46, a plurality of source files 47, a Render Table 48, and a plurality of rendered files 49.

The domain information robot 22 is responsible for querying the DNS registries for domain names. The Registry Table 24 maintains query data for each known domain name registry. Each record in the Registry Table 24 includes a RegistryName text field, a LastQueryTime date field, and a QueryTime date field. As illustrated, the domain information robot 22 queries the Registry Table 24, accesses data from the table, and updates the table data. Based on the Registry Table fields, the domain information robot 22 queries the appropriate domain registry. The table data can also be populated from other sources, including bulk data and autonomous spiders or crawlers.

The domain information robot 22 stores data received from the registries in the Domain Table 26. Each record in the Domain Table 26 includes a RegistryPtr pointer field, a DomainName text field, a WhoisPtr pointer field, and a TimeStamp date field. The Domain Table 26 stores the data that drives much of the archival process.

For each record in the Domain Table 26, the registry retrieval robot 32 reads data from the DomainName and RegistryPtr fields and performs a WHOIS query on that domain name in the appropriate registry. The data can also be extracted from a bulk data file. The resulting Whois information is stored in a simple text format as a Whois file 39, which can be compressed to save storage space. Information about the Whois file 39 is maintained in the Whois Table 34.

FIG. 3 illustrates an exemplary Whois file 39 of FIG. 2. As shown, various data fields stored by the registrar are provided in response to the query, including the identity of the named registrant. As further shown, the Whois query includes extraneous text supplied by the registrar. The extraneous text can be stored but may be filtered from the file before storing, especially if the registrar may frequently change the text.

Each Whois file 39 has a respective record in the Whois Table 34. Each record in the Whois Table 34 includes a Checksum integer field, a FilePtr pointer field, a PrevPtr pointer field, a NextPtr pointer field, and a TimeStamp date field. For each Whois file, a checksum is computed and stored in the Checksum field to authenticate the stored Whois file 39. The PrevPtr and NextPtr fields are used to create a chain of Whois records for a particular domain name. That is, a history report of Whois data can be requested and generated from the Whois Table 34 data, even if the domain name registrant transfers from registrar to registrar.

The DomainName field of the Domain Table 26 also seeds the page retrieval robot 42. Using the domain name, the page retrieval robot 42 accesses the domain and retrieves all pages in that domain. Of particular interest is the WWW third level domain, but other third level domains can be processed using a similar method. The page retrieval robot 42 downloads the page source files (e.g. HTML, JPEG, WAV, MPEG, MP3 files) and also the browser-displayed rendition of the pages (when applicable) and stores them as source files 47 and rendered files 49, respectively.

Figure 4:
FIG. 4 illustrates an exemplary source code file of FIG. 2.

FIG. 4 illustrates an exemplary source code file 47 of FIG. 2. As shown, the file 47 is an HTML file. In addition to source for the displayed text, metatags are also in the file and indexable. Other file formats are also supported.

FIG. 5 illustrates an exemplary browser-rendered file 49 for the source code file of FIG. 4. The rendition is generated from the source code by the browser code.

Each page is identified by its URL. Each URL has an individual record in the Page Table 44. The fields in the Page Table 44 include a URL text field, a DomainPtr pointer field, and a CurrentSourcePtr pointer field. The DomainPtr points to the appropriate Domain Table 26 record for the URL. The CurrentSourcePtr points to an appropriate record in the Source Table 46.

The Source Table 46 associates a database record with a stored source file 47 and is populated by the page retrieval robot 42. The Source Table 46 includes a UrlPtr pointer field, a Checksum integer field, a PageRenderPtr pointer field, a PrevSourcePtr pointer field, a NextSourcePtr pointer field, a FilePtr pointer field, and a TimeStamp date field. The UrlPtr points to the associated record in the Page Table 44. The Checksum field stores the computed checksum of the source file 47, which is pointed to by the FilePtr field. The PrevSourcePtr and NextSourcePtr fields point to previous and next records in the history chain of the URL. The PageRenderPtr points to an associated record in the Render Table 48.

The Render Table 48 associates a database record with the stored rendered file 49. The Render Table 48 includes a Checksum integer field, a FilePtr pointer field, and a TimeStamp date field. As above, the Checksum field stores a computed checksum of the associated rendered file 49, which is pointed to by the FilePtr field.

The autonomous page retrieval robot 43 can be useful in identifying pages stored under other than WWW third-level domains, such as "ftp", "people", "sales", etc. In this regard, the autonomous page retrieval robot 43 can operate as a standard spider—following links from URL to URL—populating the Page Table 44 as it proceeds. This technique can be particularly useful when the third-level domain is unusual. The system can also make use of web site registration as is commonly used by prior art Internet search engines.

The Indexer 15 maintains a searchable full-content index of the Whois files 39, the source files 47, and the rendered files 49. The Indexer 15 can be any suitable commercially-available indexer that can index the stored files. Those files can then be compressed for archival storage. In a particular embodiment, the rendered files 49 are stored in Adobe Public Display Format (PDF) for portability. The conversion from the native format to the compressed format is accomplished by the registry retrieval and the page retrieval robots during the download process. The checksums are computed from the native Whois files, source files, and generated renditions before being compressed into the archived files 39, 47, 49.

The user interface module 50 receives user requests and responds with reports 59. The user interface module 50 is generally used for broad queries of the stored files 39, 47, 49. For example, a user may be interested in all files that contain the trademark TRIEVE. The full-text index would be used to identify all such files and the user interface module would prepare a report of those files. This solution would report all web sites and domain names, for example, that use the trademark in displayed text as well as undisplayed text, such as metatags.

Using a suitable image signature engine, the indexer 15 can index and search both image source files and rendered pages to identify trademark (including service mark) use in images to combat cyberstuffing and to identify digital signatures and watermarks from works if authorship to combat copyright infringement. A particular image signature engine suitable for computing digital signatures of and indexing image files is Visual Image Retrieval from Virage, Inc of San Mateo, Calif. A particular embodiment of the Virage technology is embodied in Oracle 8i Visual Image Retrieval, commercially available from Oracle Corporation. Similarly, signatures can be generated for other multimedia content, such as audio and video data. For example, the VideoLogger program commercially available from Virage, Inc. can be integrated with the Oracle database to facilitate indexing of video content. A suitable audio recognition and signature engine is TRM, commercially available from Relatable, LLC of Alexandria, Va.

The program interface module 55 provides narrow reports about a particular URL, or second-level domain name. For example, a user may be interested in a detailed history of a specific URL for a web page on its web server. The resulting report 59 can provide step-by-step details of the page's evolution over time, including ownership information and source HTML.

It is recognized that information may exist on some web sites longer than others. For example, news sites can be continuously updated throughout a day, while personal web sites may go months without an update. The page retrieval module 40 can be triggered to access certain identified sites on an accelerated schedule. For most sites, an access interval of a few days should be sufficient. Alternatively, the server 10 and the page can support a common protocol, where changes to a page trigger the page retrieval module 40.

In a particular embodiment of the system, the server modules share a common protocol with the content providers 3, 7 so that information can be retrieved easily. It is also recognized that the server modules may have to support multiple protocols and that some content provides 3, 7 may provide no program interface protocols. A suitable language for use on the system is Network Query Language, commercially available from NQL Inc., of South Coast Metro, Calif.

Figure 6:
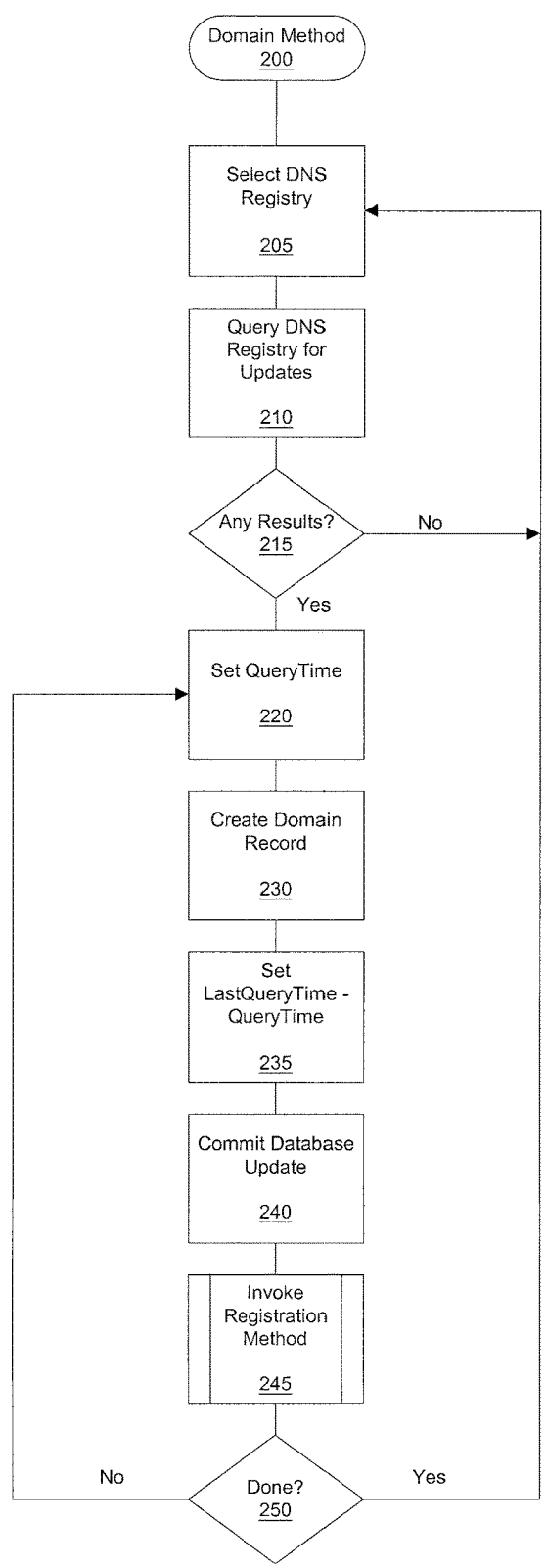
FIG. 6 is a flowchart of the method employed by the domain information robot 22 of FIG. 2.

FIG. 6 is a flowchart of the method employed by the domain information robot 22. The domain method 200 begins a loop at step 205. There the method first selects a DNS RegistryName from the DNS Table. At step 210, the Registry is queried for domain names created since the last such query, stored in the LastQueryTime field of the DNS Table. At step 215, a check for results is made. If no new domains were found, the loop continues by reverting to step 205.

If results were found at step 220, then processing continues to step 225, which starts another loop. At step 225, the QueryTime field in the DNS Table is set to a valid timestamp for the query results, such as the value of a date/time field in the query result header. At step 230, a domain record is created in the Domain Table for the first new domain name. At step 235, the LastQueryTime field is updated with the time of the query, QueryTime. At step 240, the database updates are committed. At step 245, a call is made to the Whois Robot method, passing the domain name, to obtain the related Whois data. At step 250, a check is made to determine if there are other new records. If so, the method reverts to step 225 to process the next domain name; otherwise, the method reverts to step 205 to query another Registry.

Figure 7:
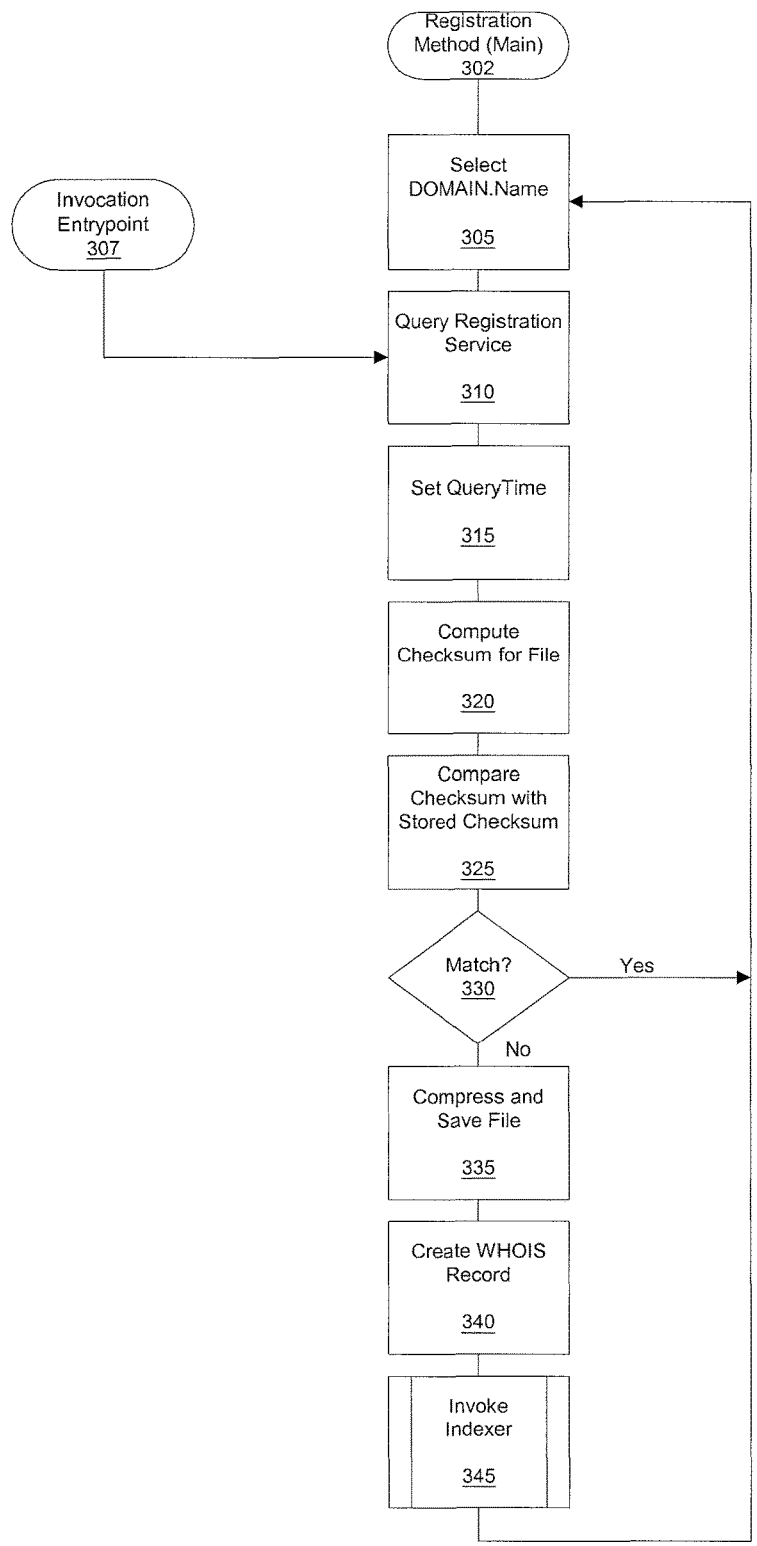
FIG. 7 is a flowchart of the method employed by the registry retrieval robot 32 of FIG. 2.

FIG. 7 is a flowchart of the method employed by the registry retrieval robot 32. The Whois method 300 has two entry points: a main entry point at step 302 and a call interface entry point at step 307. The WHO method 300 can be periodically executed to refresh registry data for previously stored domains.

The main method begins at step 305, where the next DomainName field in the Domain Table is read. At step 310, which is also the first step of the call interface entry 307, the method queries the associated registry, obtained from the RegistryPtr field, using an external interface to the registry database, such as a "WHOIS" service. Next, at step 315, a local variable QueryTime is set to a valid timestamp for the query, such as a value from a query result header.

At step 320, the method computes the checksum of the retrieved Whois file. At step 325, the resulting checksum is compared with the stored Checksum field of the Whois table WHOIS.Checksum. This is done so that an unchanged Whois files is not stored, which would require a new Whois table record. To save space and overhead, only changed files are tracked.

Consequently, a check is made at step 330. If the checksums match, processing reverts to step 305 to process the next Domain name. If there is a difference in the checksums, processing continues to step 335.

At step 335, the file is stored as a compressed PDF file 39. At step 340, a new Whois table record is created for the stored file 39. The fields in the new record are updated with computed checksum and the QueryTime stamp. At step 345, the stored Whois 39 file is indexed by calling the Indexer.

Figure 8A:
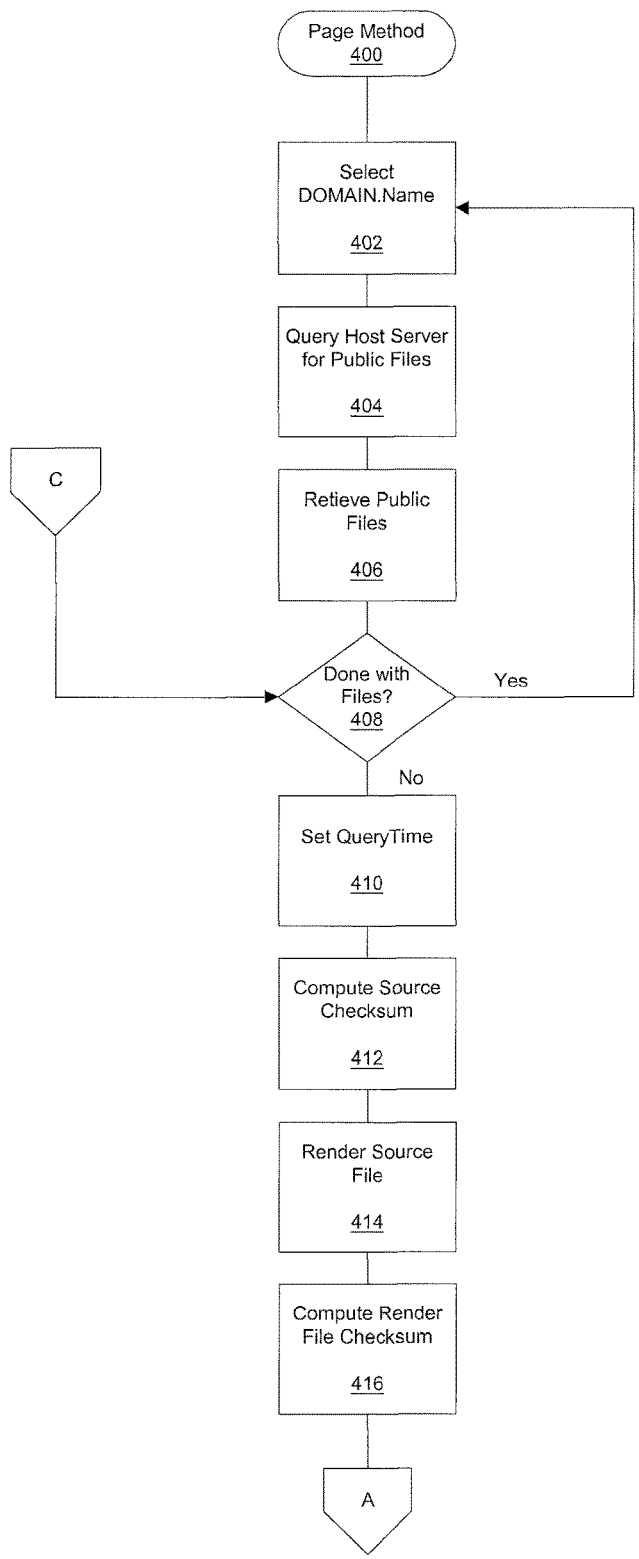
FIGS. 8A-8C are flowcharts of the method of the page retrieval robot 42 of FIG. 2.
Figure 8B:
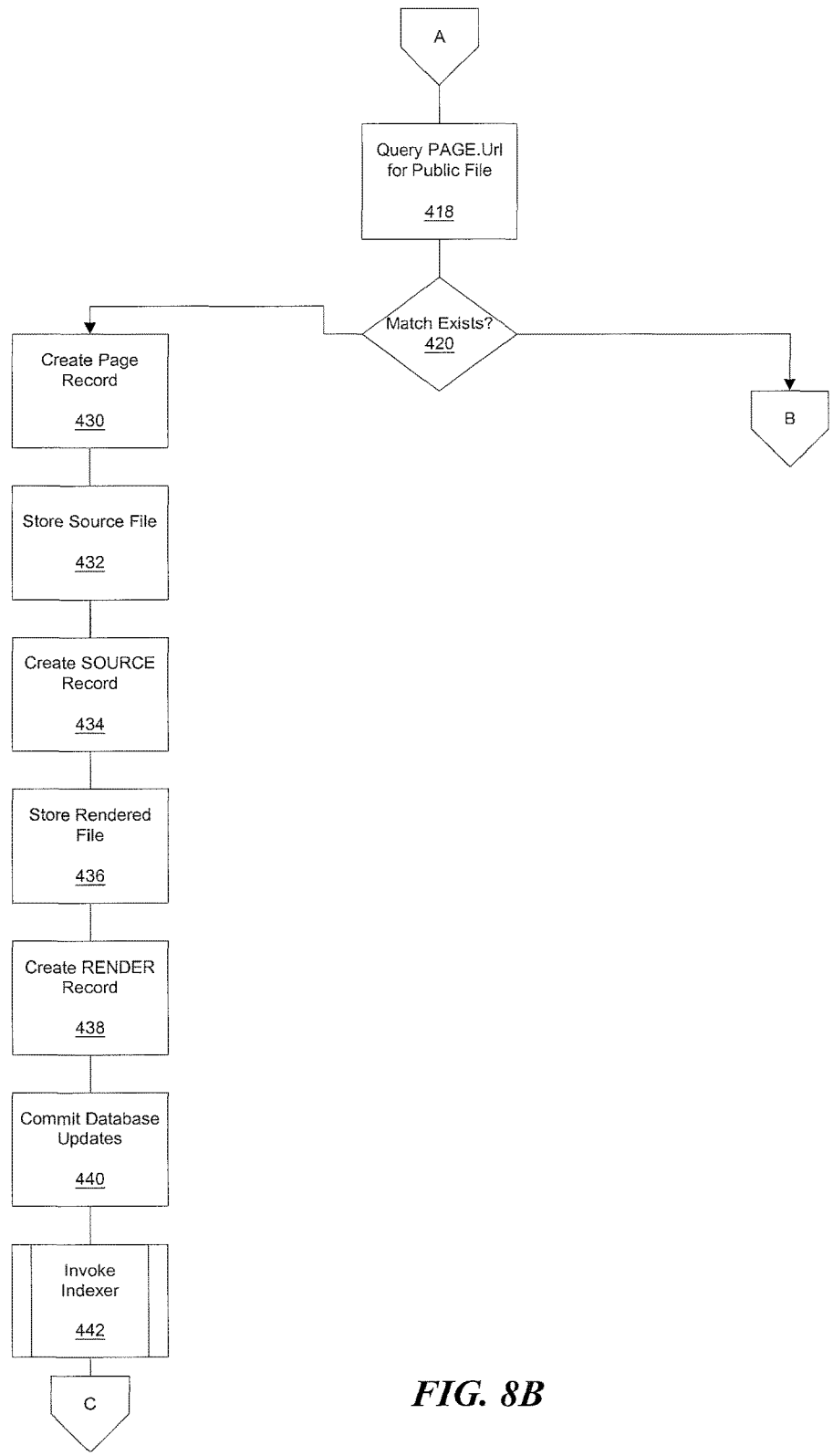
Figure 8C:
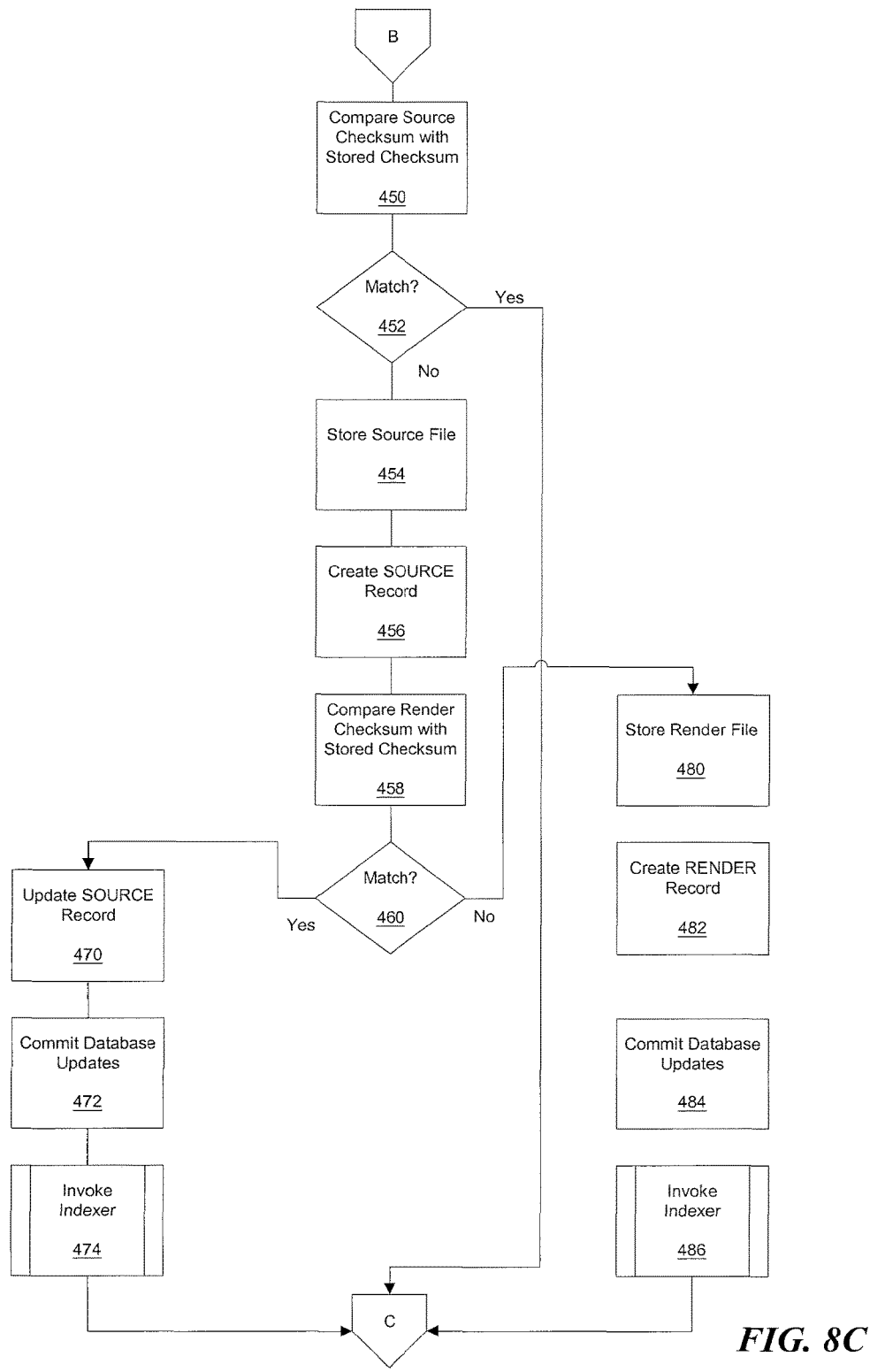

FIGS. 8A-8C are flowcharts of the method of the page retrieval robot 42. The PAGE method 400 begins in FIG. 8A. Beginning at step 402 (FIG. 8A), the method 400 selects the next second level domain from the Domain Table—Domain-.Name. The domain server is then queried, at step 404, to reveal public files available from the current second level domain. The domain server returns a list of public files, the source files are retrieved and locally stored at step 406.

A loop through each public file begins at step 408. Once all the public files have been processed for the current second level domain, processing returns to step 402 to select a new second level domain. Processing of individual public files begins at step 410.

At step 410, a local QueryTime field is set to a valid timestamp for the query, such as the date/time field of the query result header, such as the HTTP header. At step 412, a source checksum is computed from the retrieved source file for the public file. At step 414, the source is executed via browser software to yield a rendition of the source, which is locally stored as a rendered file. For completeness, the source file can be separately rendered in each browser explicitly supported by the source code. At step 416, a checksum is computed from the rendered file. Turning to FIG. 8B at step 418, the method queries the Page Table for a URL record—PAGE.Url matching the public file name. If no match is found (step 420), processing jumps to step 430; otherwise processing jumps to step 465 (FIG. 8C).

For a new page there will be no corresponding record in the Page Table. Although it is possible that a preexisting copy of the page has already been stored in the database under a different URL, for simplicity and easy of description, it will be assumed that a renamed source file is stored separately. A removed page will result in a 404 error and the error display can be stored under the URL.

For the new page a new Page Table record is created at step 430. The URL of the new page is stored in the Url field—PAGE.Url. The DomainPtr field is set to point to the Domain Table record of the second level domain. At step 432, the source file is converted to PDF format and stored in the warehouse 12 as a source file 47. A new Source Table record is created at step 434 and pointed to by the PAGE.CurrentSourcePtr field.

In the new Source Table record, the UrlPtr is set to point to the new Page Table record. The Source Table fields can then be populated: the FilePtr points to the stored PDF source file, the Checksum field is set to the computed checksum, and the TimeStamp is set to the QueryTime value. The PrevSourcePtr and the NextSourcePtr are null. At step 436, the rendered file is converted to PDF format and stored in the warehouse 12 as a rendered file 49. A new Render Table record is created at step 438 and pointed to by the SOURCE.PageRenderPtr.

The new Render Table record can now be populated: the FilePtr points to the stored PDF file, the Checksum field is set to the computed checksum, and the TimeStamp is set to the QueryTime value. The updates can now be committed to the database at step 440. At step 442, the indexer is invoked, passing the pointers to the files. Processing then reverts to step 408.

To update preexisting URLs, the method follows the logic starting at step 450 (FIG. 8C). At step 450, the source file checksum is compared with the checksum of the source file pointed to by the Page Table record, namely PAGE.CurrentSourcePtr:FilePtr. If the source checksums match (step 452), the source file has not been modified relative to the stored source file and the database is considered up to date and processing can revert to step 410; otherwise the database must be updated.

To update the database, at step 454, the local source file is converted to PDF format and stored in the warehouse 12 as a source file 47. A new record is created in the Source Table, at step 456, with the FilePtr field pointing to the stored PDF source file, the source checksum stored in the Checksum field, and the QueryTime stored in the TimeStamp field. The PrevSourcePtr is set to point to the prior source record, which has its NextSourcePtr set to point to the new record. The record is not yet related to a Render Table record. Processing then proceeds to step 438 to process the rendered file.

If the source file is new, it cannot be assumed that its rendition is new because much of the changeable text in the source file may not cause a content change. In comparison, the rendition can change without a change in the source file because of counters, banners, or other external content. To conserve storage space and to limit the amount of redundant query results, such non-source related modifications are not stored in the database.

The rendered file is processed in much the same way as the source file. The rendered file checksum is compared, at step 458, with the checksum of the rendered file pointed to by the Page Table record, namely PAGE.CurrentSourcePtr. If the rendered file checksums match, at step 460, then the rendered file has not been modified relative to the stored rendered file; otherwise the new rendered file is stored. In either case, database relationships are updated.

To update the database in the case of an up-to-date rendered file, the Source Table record is updated at step 470. In particular, the PageRenderPtr field is set to point to the current record in the Render Table. Note that there may be more than one Source Table record pointing to the same Render Table record. The many-to-one relationship helps to conserve storage requirements. At step 472, the database updates are committed to the database.

If the rendered file is new, the local rendered file is converted to PDF format and stored in the warehouse 12 at step 480 as a rendered file 49. A new record is created in the Rendered Table, at step 482, with the FilePtr filed pointing to the stored PDF rendered file 49, the rendered file checksum stored in the Checksum field, and the QueryTime stored in the TimeStamp field. In the Source Table, the PageRenderPtr is set to point to this Render Table record. The database relationships between the Page, Source, and Render Tables are now set and the database updates can now be committed to the database at step 484. The method then invokes the indexer 15, at step 486, passing the respective FilePtr fields, to index the contents of the source and rendered files 47, 49.

Processing then loops back to step 410 to process the next file from the domain server. Note that the illustrated method only processes public files and does not mine database data from web sites. Such information, however, could be incorporated into the system by one of ordinary skill in the art.

Figure 9:
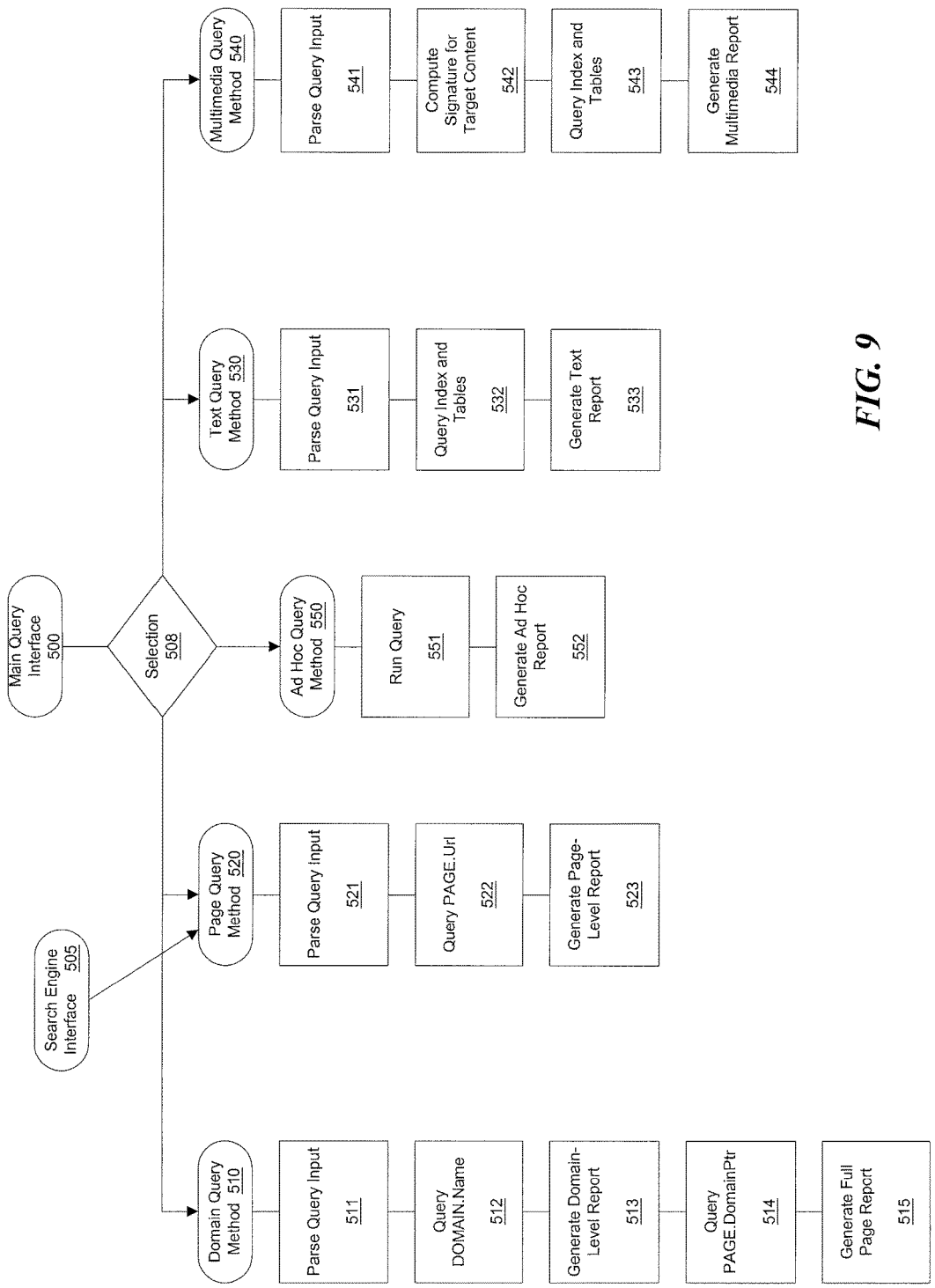
FIG. 9 is a flowchart of the method of the user interface module 50 of FIG. 2.

FIG. 9 is a flowchart of the method of the user interface module 50. A function of the user interface module is to facilitate user access to the archived information at a main interface 500. The method is controlled by a query type selection at step 508, which can include a domain name query 510, page query 520, text query 530, and a multimedia query 540.

Figure 10:
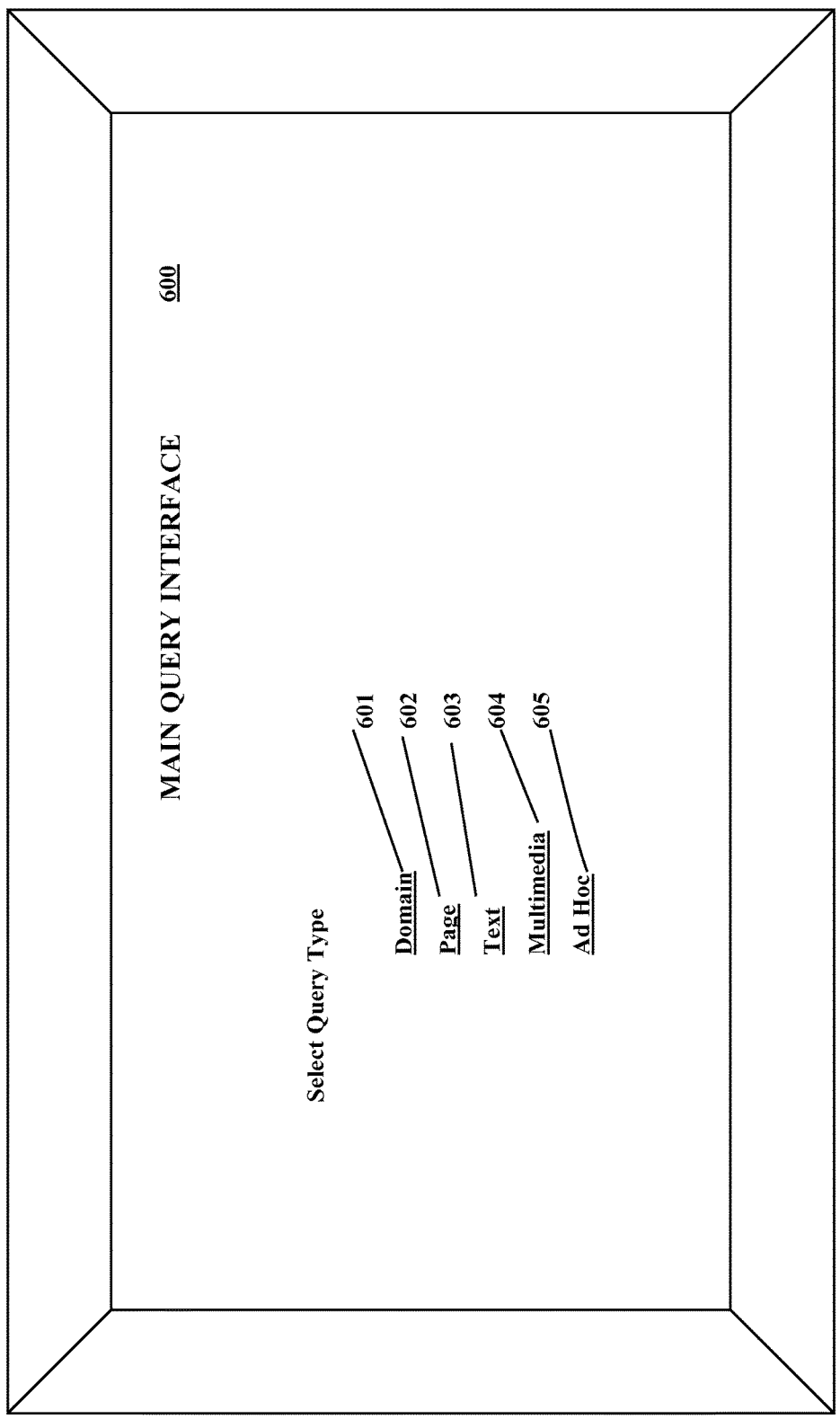
FIG. 10 illustrates an exemplary user interface for the query selection method of FIG. 9.

FIG. 10 illustrates an exemplary user interface for the query selection method of FIG. 9. The interface 600 prompts the user to select one of the query types, each being hyperlinked 601, 602, 603, 604, 605 to a respective query interface.

Returning to FIG. 9, for a domain name query 510, the user provides a second level domain name and possibly other parameters, such as a date range, which are parsed at step 511. The method queries the domain table 26 (FIG. 2) at step 512 and associated stored files to generate a domain registration report at step 513. From the domain results, the page table 44 (FIG. 2) can be queried at step 514 and a report can be generated at step 515 to identify all the pages on a web site. With this query, the state of the web site at a specific time can be reproduced with complete ownership information, and historical source and image content.

Figure 11:
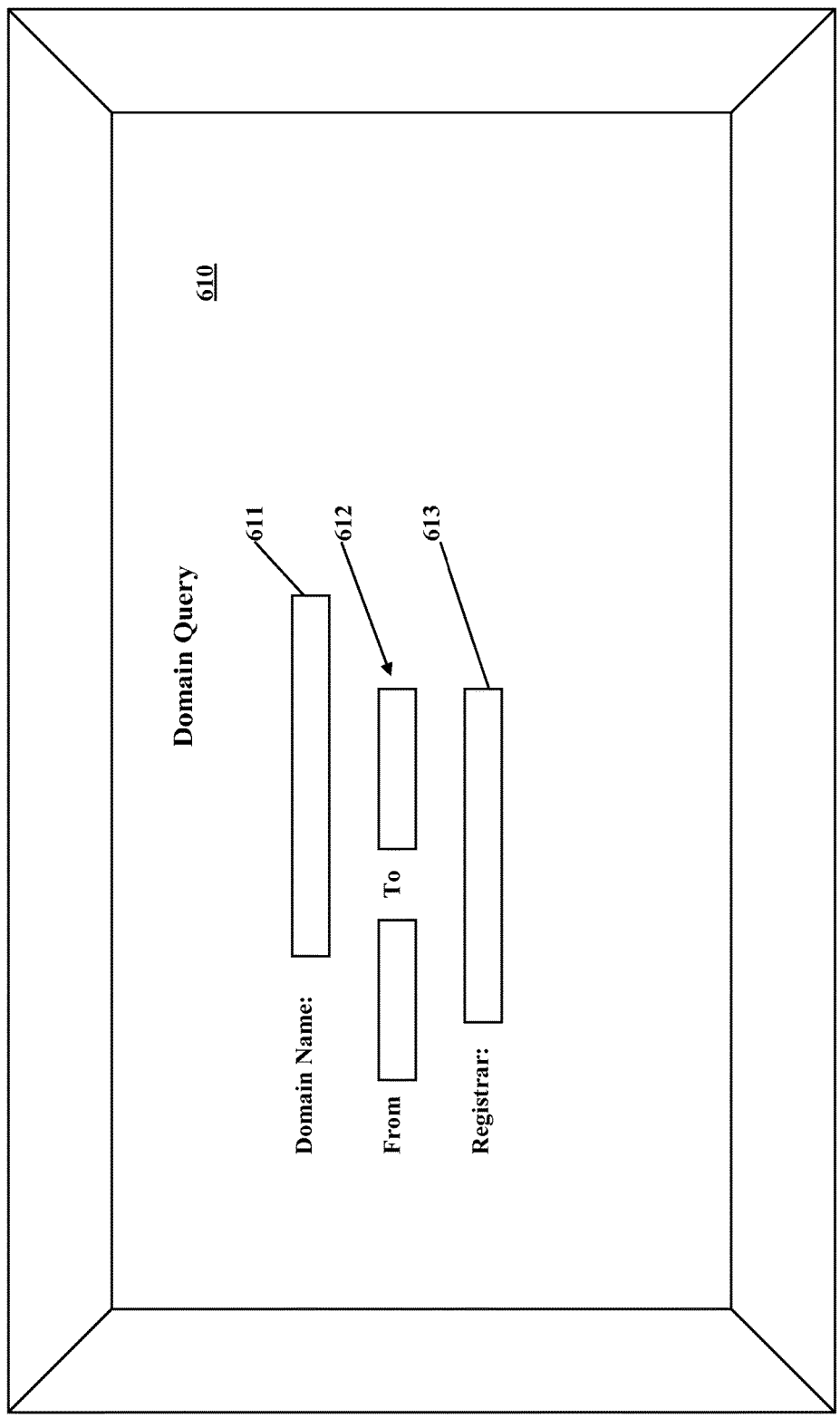
FIG. 11 illustrates an exemplary user interface for the domain query method of FIG. 9.

FIG. 11 illustrates an exemplary user interface for the domain query method of FIG. 9. This interface presents the user with input fields. A domain name 611 is a required input. A date range 612 and registrar 613 fields can be used to narrow the query.

Returning to FIG. 9, for a page query 520, the user provides a specific URL and possibly other parameters, such as a date range, which are parsed at step 521. Here, in particular, the user can be associated with a remote Internet search engine 5 (FIG. 1) through a search engine interface 505. The method 520 queries the Page Table 44 (FIG. 2) to find matching records and associated stored files. From the query result, a report can be generated at step 523 to identify the history of the specific URL. Using this query would allow a user to identify when a particular content was incorporated into the page and how long it had been there.

Figure 12:
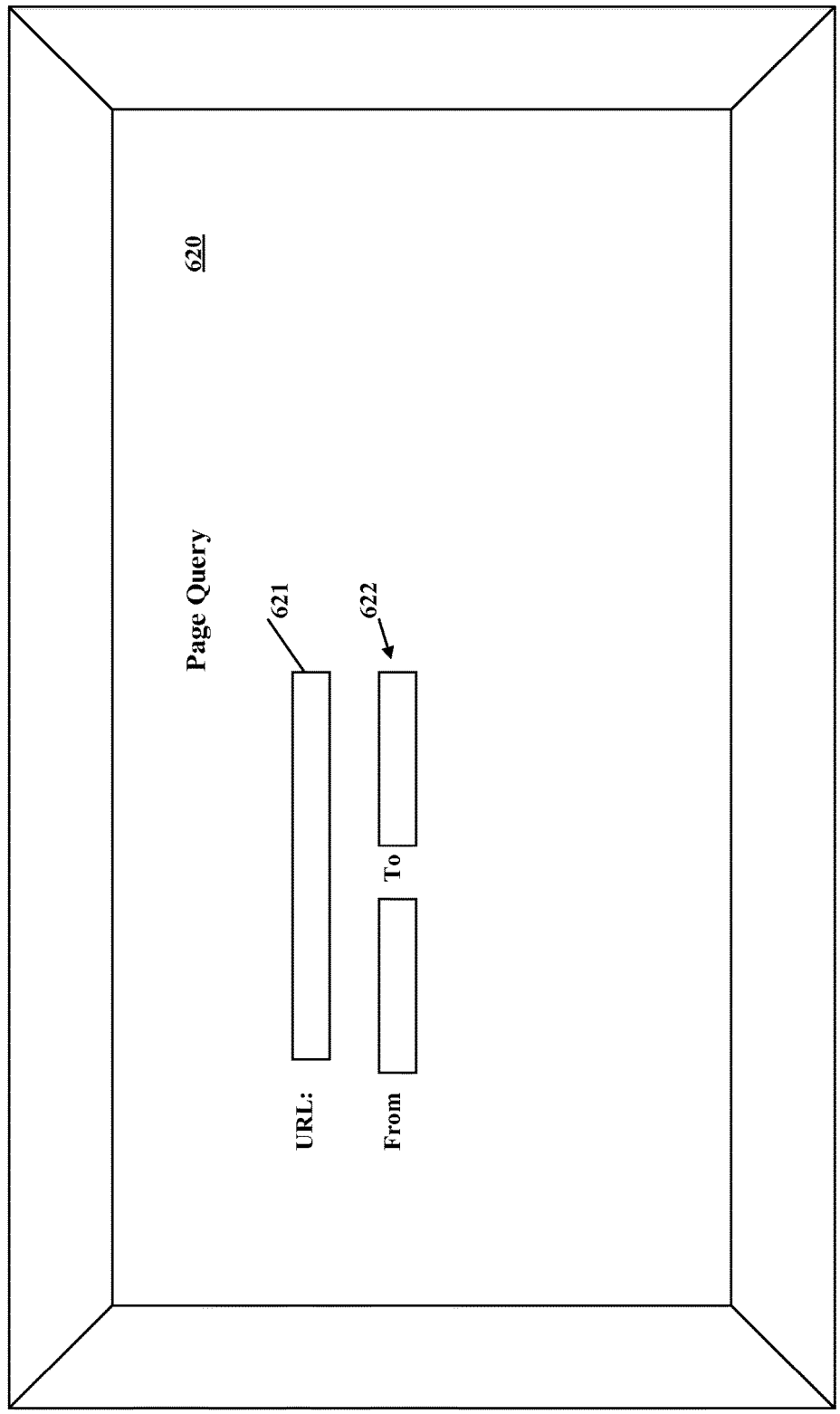
FIG. 12 illustrates an exemplary user interface for the page query method of FIG. 9.

FIG. 12 illustrates an exemplary user interface for the page query method of FIG. 9. This interface 620 also presents the user with input fields. A URL 621 is a required input, with an optional date range 622.

Figure 13:
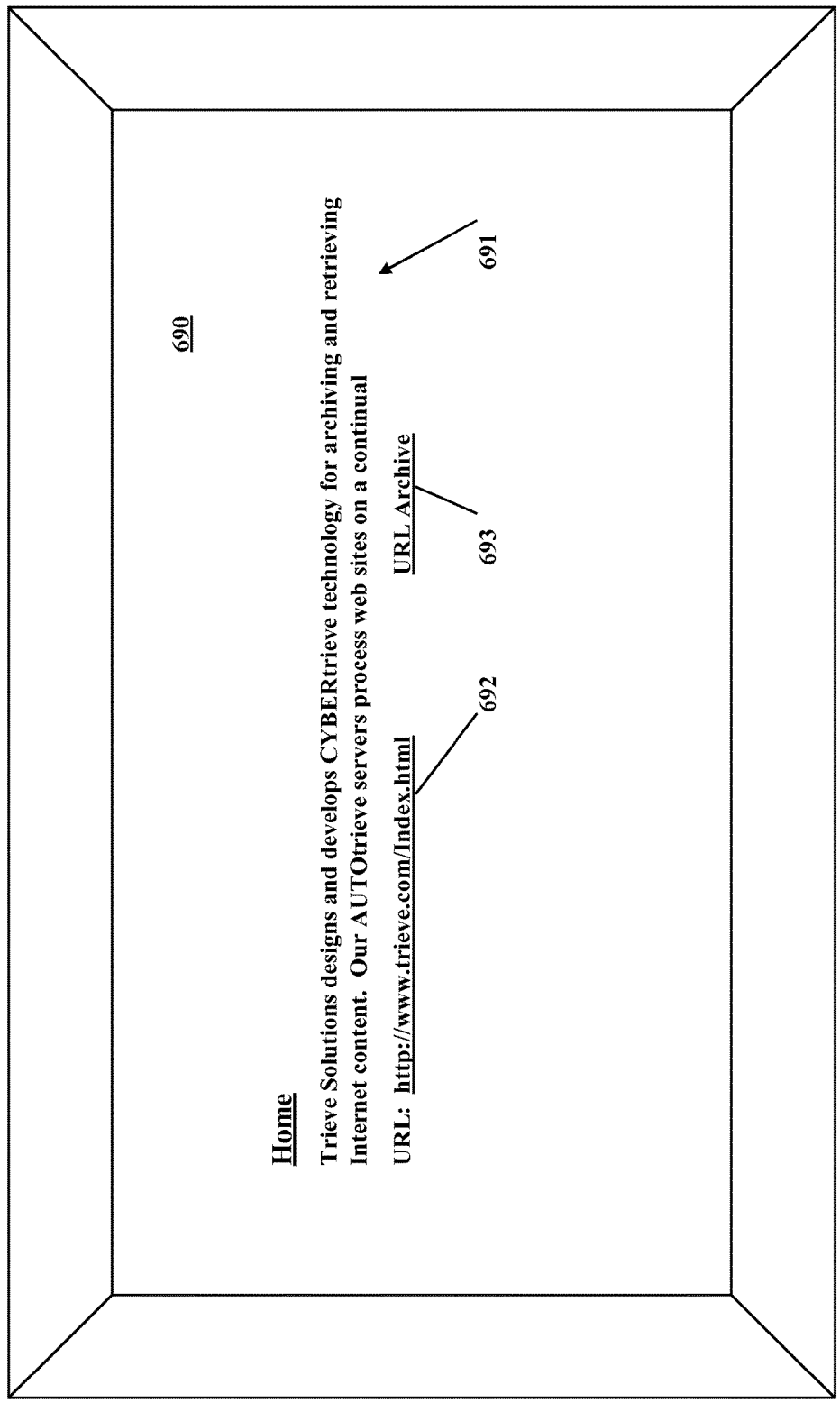
FIG. 13 illustrates an exemplary user interface for the search engine page query method of FIG. 9.

FIG. 13 illustrates an exemplary user interface for the search engine page query method of FIG. 9. Shown is a possible search engine display 690. As with prior art search engines, the display 690 provides a brief description of the identified web page 691 with a hyperlink to the content's URL 692. Also shown is a hyperlink 693 to the page query method 520. The link 693 automatically provides the specified URL as a parameter.

Returning to FIG. 9, for a text query 530, the user provides target text (either directly or indirectly via entry of a file location) and possibly other parameters, such as a date range, which are parsed at step 531. At step 532, the method queries the indexer 15 (FIG. 1), passing the target text, and the database tables 12a (FIG. 1), based on the parameters. The indexer returns a list of pointers to stored source files matching the target text. The results from the indexer query and the database query are combined to generate a report to the user at step 534. If the user is an interactive system user, the user can browse the results and modify the query accordingly. To reduce the query effort, the intermediate query results from the indexer query and the database query are temporarily saved, for further use.

The results of the text query can also be filtered by a subcategory, such as registry (Whois) and source. That is, a searcher only interested in Whois records can limit the query results to those records. Likewise, some searchers may only be interested in web page content and limit their results to source and rendered files. Other users may restrict the results to source files to identify metadata in the source files.

Figure 14:
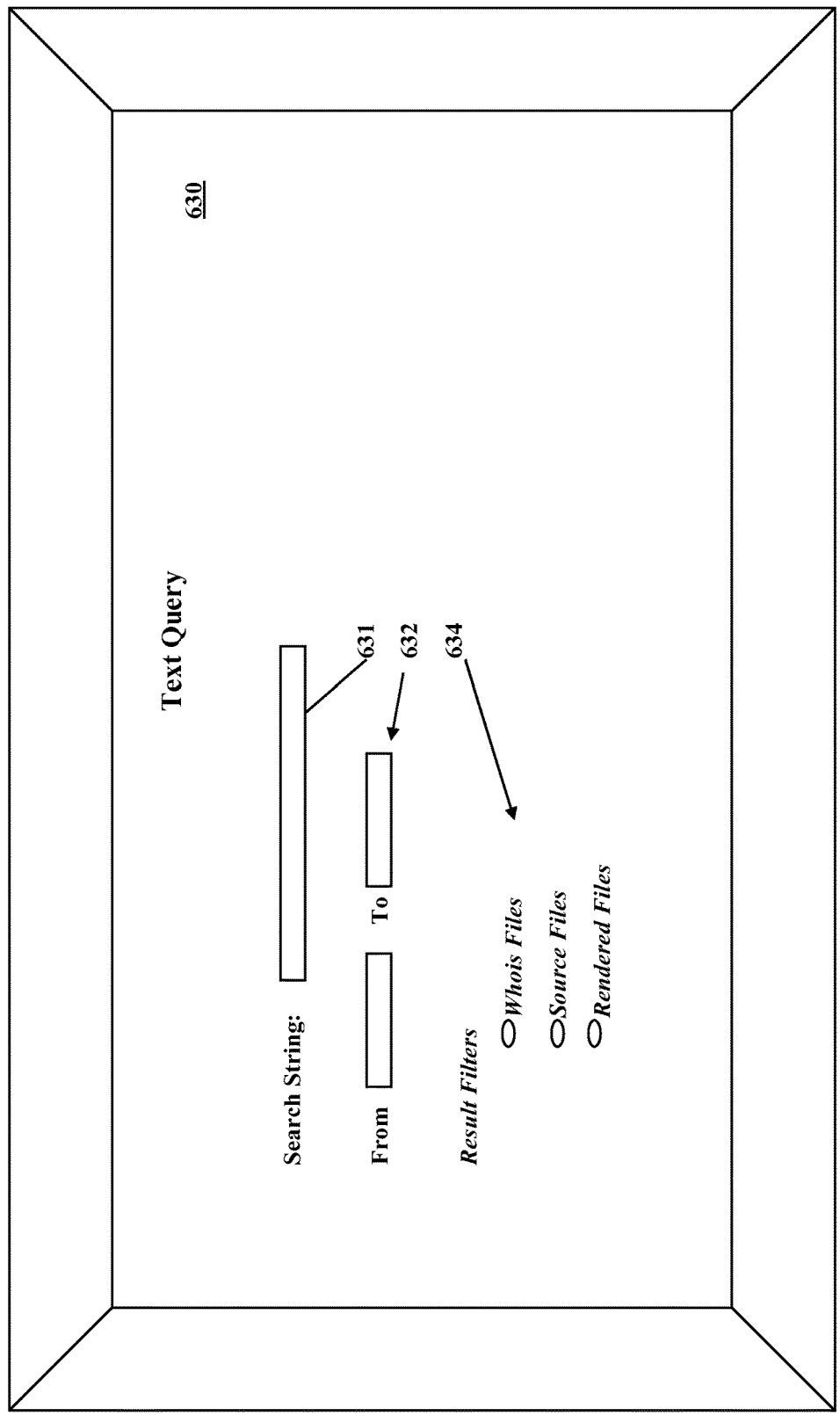
FIG. 14 illustrates an exemplary user interface for the text query method of FIG. 9.

FIG. 14 illustrates an exemplary user interface for the text query method of FIG. 9. This interface 630 requests user entry of a query string 631. The query string 631 can include boolean or other suitable operators. The user can also enter a file location of a file having a long text passage. The user can also provide a date range 632 to narrow the query. In addition, the user can filter the query by specifying stored files to exclude 634.

Returning to FIG. 9, the multimedia query 540 identifies multimedia (audio, video, image) files having content similar to a target content provided by the user. The method first parses query parameters at step 541. At step 542, the method computes a signature for the target content. The query is run at step 543 against the index and the tables. The target signature is passed to the indexer 15 (FIG. 2). The indexer 15 can then return a list of pointers to multimedia files, ranked by similarity to the target content. The method also searches the Source Table 46 (FIG. 2) and Render Table 48 (FIG. 2) based on supplied parameters. The results from the indexer query and the database query are combined to generate a multimedia report to the user at step 544. If the user is an interactive system user, the user can browse the results and modify the query accordingly. To reduce the query effort, the intermediate query results from the indexer query and the database query are temporarily saved, for further use.

Figure 15:
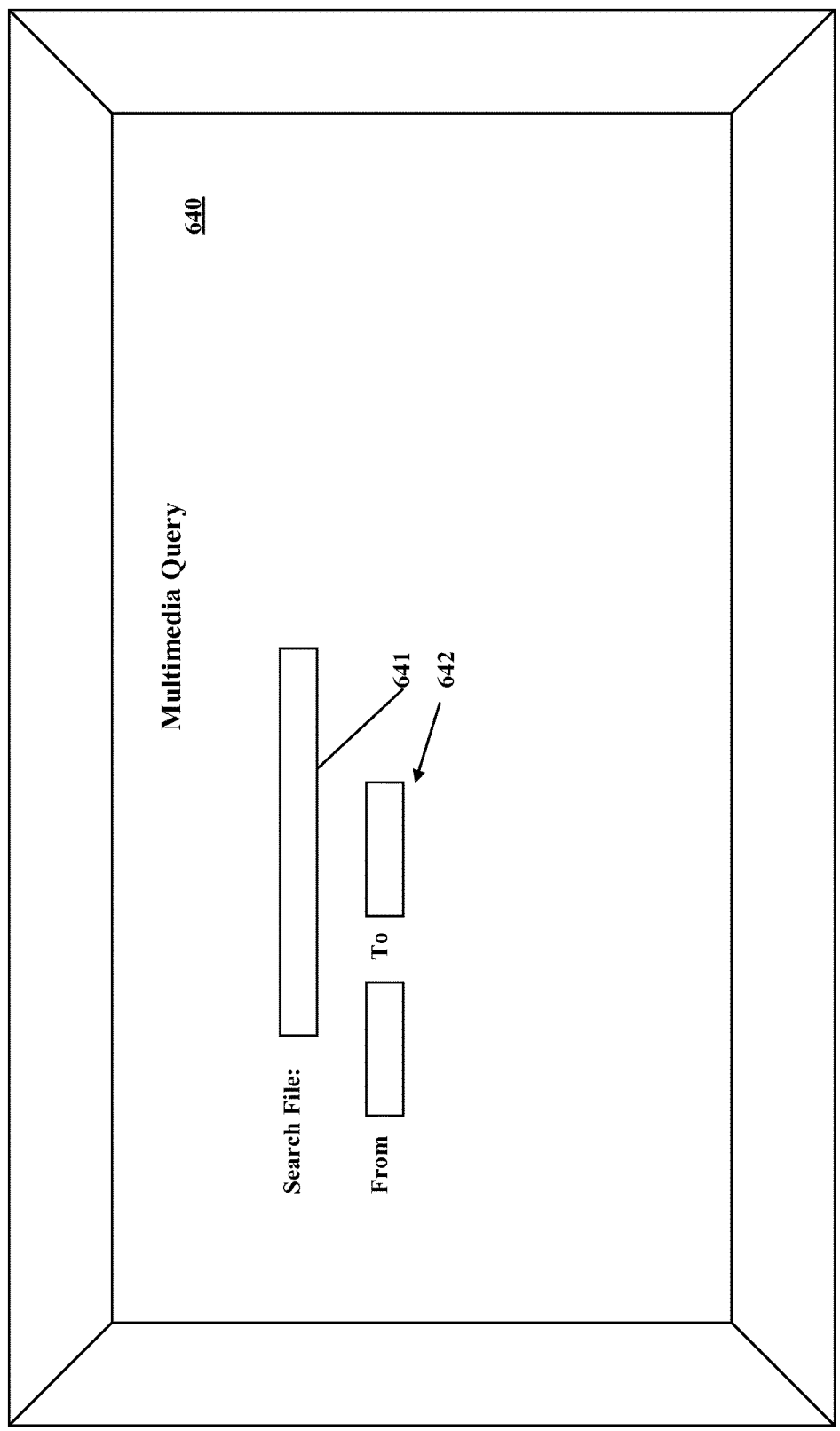
FIG. 15 illustrates an exemplary user interface for the multimedia query method of FIG. 9.

FIG. 15 illustrates an exemplary user interface for the multimedia query method of FIG. 9. This interface 640 requests a filename 641, which can be a local file or a remote file (including network files and Internet files). The query can be limited to a specific date range 642.

Returning to FIG. 9, it should be recognized that the system can support additional queries, such as ad hoc queries 550. At step 551, the query is run, as entered by the user. A report is then generated, at step 552, for presentation to the user.

FIG. 16 illustrates an exemplary user interface for the ad hoc query method of FIG. 9. As shown, this interface 650 permits the user to enter any SQL query 651, which may be stored in a file, whose location is entered by the user.

Additional fields can also be added to the tables 12a, such as a file type field in the Source Table 46 or Whois fields in the Whois table 34, to improve query efficiency. Data from the tables 12a can also be stored with the files 12b as metadata indexed by the indexer. The system can also include fuzzy logic to identify similar, but not exact matches. The system can also incorporate a language translator to facilitate locating foreign language equivalents. Additional queries can also be added to the system to generate useful reports to the user community.

Those of ordinary skill in the art should recognize that methods involved in a data archival and retrieval system for internet worked computers may be embodied in a computer program product that includes a computer-usable medium. For example, such a computer-usable medium can include a readable memory device, such as a solid state memory device, a hard drive device, a CD-ROM, a DVD-ROM, or a computer diskette, having computer-readable program code segments stored thereon. The computer-useable medium can also include a communications or transmission medium, such as a bus or a communications link, either optical, wired, or wireless, having program code segments carried thereon as digital or analog data signals.

While the system has been particularly shown and described with references to particular embodiments, it will be understood by those skilled in the art that various changes in form and details may be made, without departing from the scope of the invention as claimed. For example, embodiments of the invention can be applied to various environments, and are not limited to the described environment. Furthermore, embodiments of the invention are not limited to the archival and retrieval of intellectual property references. As such, various embodiments of the invention can be encompassed by the appended claims.

I claim:

1. A computerized system for archiving and retrieving content collected from electronic addresses over time, comprising:
   data stored in a computer-accessible organized structure, including a content storage structure having data related to a plurality of archived content files stored therein, and a provider storage structure having data related to a plurality of content providers stored therein;
   a content storage module in communication with the content storage structure and a source electronic address, the source electronic address referencing a source content file having source data therein, the content storage module:
      deriving an archived data file having archived content therein from the source content file referenced by the source electronic address, and
      storing the archived content file in the content storage structure with a content timestamp;
   a mechanism in communication with the content storage structure and the provider storage structure, the mechanism determining a source content provider from the provider storage structure responsible for the source content at the source electronic address, the mechanism associating the archived content file within the content storage structure with the source content provider within the provider storage structure based on the content timestamp;
   an indexer in communication with the content storage structure, the indexer calculating a searchable electronic index of the archived content of the archived content file;

a user interface module in communication with a user, the user interface module soliciting a query parameter from the user for a desired content, the desired content having a match within the archived content of the archived content file;

a query engine in communication with the user interface module and the searchable electronic index, the query engine identifying the archived content file based on the query parameter and the searchable electronic index; and a query result presented to the user by the user interface module in response to the identified archived content file, the query result including a representation of the archived content file and the associated source content provider.

2. The system of claim 1 wherein the desired content is at least one of a text string or a multimedia target.

3. The system of claim 1 wherein the content storage structure stores a plurality of archived content files associated with the source electronic address, each of the archived content files having a different archived content and a different content timestamp, the query engine using the different content timestamps to construct a history of changes to the archived content associated with the source electronic address over time.

4. The system of claim 1 wherein the content storage structure stores a plurality of archived content files associated with the source electronic address, each of the archived content files having a different content timestamp, the query engine using the different content timestamps to construct a history of changes to the source content provider associated with the source electronic address over time.

5. The system of claim 1 wherein the mechanism associates the archived content file with the source content provider based on the content timestamp.

6. The system of claim 1 wherein the representation of the archived content file includes a program-rendered image of the archived content data.

7. The system of claim 1 wherein the content storage module is responsive to actions of the associated content provider.

8. The system of claim 7 wherein the actions of the associated content provider include a change to the source content file at the source electronic address.

9. The system of claim 1 wherein the content provider is selected from at least one of a domain name service registry and a web server.

10. The system of claim 1 wherein the archived content file is a digital copy of the source content file.

11. The system of claim 1 wherein, for the source electronic address, the archived content in the archived content file is unique.

12. The system of claim 1 wherein the content storage structure includes an authentication mechanism for the archived content file.

13. The system of claim 6 wherein the program-rendered image is stored in the content storage structure with a timestamp.

14. A computerized method for archiving and retrieving content collected from electronic addresses, comprising:

storing data in a computer-accessible organized structure, including a content storage structure having data related to a plurality of archived content files stored therein, and a provider storage structure having data related to a plurality of content providers stored therein;

from a content storage module in communication with the content storage structure and a source electronic address, the source electronic address referencing a source content file having source data therein:

deriving an archived data file having archived content therein from the source content file referenced by the source electronic address, and storing the archived content file in the content storage structure with a content timestamp:

from a mechanism in communication with the content storage structure and the provider storage structure:

determining a source content provider from the provider storage structure responsible for the source content at the source electronic address, and associating the archived content file within the content storage structure with the source content provider within the provider storage structure based on the content timestamp;

in an indexer in communication with the content storage structure, calculating a searchable electronic index of the archived content of the archived content file;

in a user interface module communicating with a user, soliciting a query parameter from the user for a desired content, the desired content having a match within the archived content of the archived content file;

in a query engine communicating with the user interface module and the searchable electronic index, identifying the archived content file based on the query parameter and the searchable electronic index; and from the user interface module, presenting a query result to the user in response to the identified archived content file, the query result including a representation of the archived content file and the associated source content provider.

15. The method of claim 14 wherein the desired content is at least one of a text string or a multimedia target.

16. The method of claim 14 wherein the content storage structure stores a plurality of archived content files associated with the source electronic address, each of the archived content files having a different archived content and a different content timestamp, the query engine using the different content timestamps to construct a history of changes to the archived content associated with the source electronic address over time.

17. The method of claim 14 wherein the content storage structure stores a plurality of archived content files associated with the source electronic address, each of the archived content files having a different content timestamp, the query engine using the different content timestamps to construct a history of changes to the source content provider associated with the source electronic address over time.

18. The method of claim 14 wherein associating the archived content file with the source content provider is based on the content timestamp.

19. The method of claim 14 wherein the representation of the archived content file includes a program-rendered image of the archived content data.

20. The method of claim 14 wherein the content storage module is responsive to actions of the associated content provider.

21. The method of claim 20 wherein the actions of the associated content provider include a change to the source content file at the source electronic address.

22. The method of claim 14 wherein the content provider is selected from at least one of a domain name service registry and a web server.

23. The method of claim 14 wherein the archived content file is a digital copy of the source content file.

24. The method of claim 14 wherein, for the source electronic address, the archived content in the archived content file is unique.

25. The method of claim 14 wherein the content storage structure includes an authentication mechanism for the archived content file.

26. The method of claim 19 further comprising, from the content storage module, storing the program-rendered image in the content storage structure with a timestamp.

27. A computerized system for archiving content collected from electronic addresses over time, comprising:
   data stored in a computer-accessible organized structure, including a content storage structure having data related to a plurality of archived content files stored therein, and a provider storage structure having data related to a plurality of content providers stored therein;
   a content storage module in communication with the content storage structure and a source electronic addresses, the source electronic address referencing a source content file having source data therein, the content storage module:
      deriving an archived content file having archived content therein from the source content file referenced by a source electronic address,
      storing the archived content file in the content storage structure with a content timestamp, and
      wherein the content storage structure stores a plurality of archived content files associated with the source electronic address, each of the archived content files having a different archived content and a different content timestamp; and
   a mechanism in communication with the content storage structure and the provider storage structure, the mechanism determining a source content provider from the provider storage structure responsible for the source content at the source electronic address, the mechanism associating the archived content file within the content storage structure with the source content provider within the provider storage structure based on the content timestamp.

28. The system of claim 27 further comprising a user interface module in communication with a user, the user interface module soliciting a query parameter from the user for a desired content, the desired content having a match within the archived content of the archived content file.

29. The system of claim 28 further comprising an indexer in communication with the content storage structure, the indexer calculating a searchable electronic index of the archived content of the archived content file.

30. The system of claim 28 wherein the desired content is at least one of a text string or a multimedia target.

31. The system of claim 27 wherein the mechanism associates the archived content file with the source content provider based on the content timestamp.

32. The system of claim 27 wherein the content storage module is responsive to actions of the associated content provider.

33. The system of claim 32 wherein the actions of the associated content provider include a change to the source content file at the source electronic address.

34. The system of claim 27 wherein the content provider is selected from at least one of a domain name service registry and a web server.

35. A computerized method for archiving and retrieving content collected from electronic addresses, comprising:
   storing data in a computer-accessible organized structure, including a content storage structure having data related to a plurality of archived content files stored therein, and a provider storage structure having data related to a plurality of content providers stored therein;
   from a content storage module in communication with the content storage structure and a source electronic address, the source electronic address referencing a source content file having source data therein:
      deriving an archived data file having archived content therein from the source content file referenced by the source electronic address,
      storing the archived content file in the content storage structure with a content timestamp, and
      wherein the content storage structure stores a plurality of archived content files associated with the source electronic address, each of the archived content files having a different content timestamp; and
   from a mechanism in communication with the content storage structure and the provider storage structure:
      determining a source content provider from the provider storage structure responsible for the source content at the source electronic address, and
      associating the archived content file within the content storage structure with the source content provider within the provider storage structure based on the content timestamp.

36. The method of claim 35 further comprising, in a user interface module in communication with a user, soliciting a query parameter from the user for a desired content, the desired content having a match within the archived content of the archived content file.

37. The method of claim 36 further comprising, in an indexer in communication with the content storage structure, calculating a searchable electronic index of the archived content of the archived content file.

38. The method of claim 36 wherein the desired content is at least one of a text string or a multimedia target.

39. The method of claim 35 wherein the mechanism associates the archived content file with the source content provider based on the content timestamp.

40. The method of claim 35 wherein the content storage module is responsive to actions of the associated content provider.

41. The method of claim 40 wherein the actions of the associated content provider include a change to the source content file at the source electronic address.

42. The method of claim 35 wherein the content provider is selected from at least one of a domain name service registry and a web server.

* * * * *